United States Patent [19]
Maeyama et al.

[11] Patent Number: 5,618,859
[45] Date of Patent: Apr. 8, 1997

[54] AQUEOUS RESIN DISPERSION

[75] Inventors: Yoshihiro Maeyama; Shinobu Nakagawa, both of Sano; Hiroshi Serizawa, Kazo, all of Japan

[73] Assignee: Nippon Carbide Kogyo Kabushiki Kaisha, Tokyo, Japan

[21] Appl. No.: 525,811

[22] Filed: Aug. 25, 1995

[30] Foreign Application Priority Data

Aug. 26, 1994 [JP] Japan ................... 6-223995

[51] Int. Cl.$^6$ ................... C08L 83/00
[52] U.S. Cl. ................... 523/201; 524/501; 524/504; 525/902
[58] Field of Search ................... 523/201; 525/902; 524/501, 504

[56] References Cited

U.S. PATENT DOCUMENTS

| | | | |
|---|---|---|---|
| 5,308,890 | 5/1994 | Snyder | 523/201 |
| 5,461,125 | 10/1995 | Lu et al. | 525/293 |
| 5,500,457 | 3/1996 | Sarkar et al. | 523/201 |

FOREIGN PATENT DOCUMENTS

| | | |
|---|---|---|
| 0387664 | 3/1989 | European Pat. Off. . |
| 0507634 | 3/1992 | European Pat. Off. . |
| 88-024550 | 5/1988 | Japan . |
| 90033747 | 7/1990 | Japan . |

*Primary Examiner*—Edward J. Cain
*Attorney, Agent, or Firm*—Sherman and Shalloway

[57] ABSTRACT

This invention discloses an aqueous resin dispersion excellent in adhesion to a base material and stability, and capable of forming a coat which exhibits excellent vibration-damping properties over a wide temperature range, and moreover, is flexible and excellent in resistance to chipping and low temperature resistance to impact, and it is an aqueous resin dispersion comprising polymer fine particles dispersed in an aqueous medium, and contains, as the polymer fine particles, composite fine particles (A) comprising a core part and a shell part having specific glass transition temperatures (Tg), respectively, specific composite fine particles (B) wherein the Tg of its core part is different from that of the composite fine particles (A), and/or polymer fine particles (C) having a specific Tg.

24 Claims, No Drawings

AQUEOUS RESIN DISPERSION

The present invention relates to an aqueous resin dispersion, and more detailedly, relates to an aqueous resin dispersion excellent in adhesion to a base material and stability, and capable of forming a coat which exhibits excellent vibration-damping properties over a wide temperature range, and moreover, is flexible and excellent in resistance to chipping and low temperature resistance to impact; and particularly useful for aqueous coating compositions.

Heretofore, for preventing noise by preventing vibration on structural members such as vehicles, marine vessels, various machines, various instruments and building materials, various measures have been taken, for example, of thickening the members themselves, improving the apparatuses themselves to lower occurrence of vibration, sticking a sheet-like vibration damper on the member, applying or spraying a vibration-damping coating to prevent vibration and noise.

However, thickening the member itself has problems, for example, of bringing about increase of costs, lowering of processability, etc., and further, in the case of automobile vehicles, etc., of resulting in increase of fuel costs. In the case of sticking of a sheet-like vibration damper, cutting processing along the shape of the member becomes inevitable, and thus it has a drawback of processing being complicated.

Further, as to vibration-damping coatings, various ones have hitherto been proposed, and, for example, there have been known ones wherein materials having viscoelastic characteristics such as, for example, rubber, asphalt and various synthetic resin emulsions are used as a base, and ones wherein, in addition to such a base, inorganic powders such as graphite, mica, vermiculite, calcium carbonate, talc and clay are compounded to give mechanical hysteresis, internal friction, etc.

However, many of these so far proposed vibration-damping coatings display high vibration-damping characteristics, but have such defects that the temperature range where the high vibration-damping characteristics are exhibited is narrow, a coat formed therefrom is hard and brittle and is poor in resistance to chipping, and so on.

Further, aqueous vibration-damping coatings are excellent in the points of easy handling, safety of working environment, etc. and draw attention, but have problems that formation of thick coat is not easy in general. As to vibration-damping coatings, it is usually necessary in view of expression of their performance to form thick coats of as thick as 1,000 μm or more. Further, it is strongly desired for vibration-damping coatings to be dried rapidly at high temperatures, in view of productivity, but rapid heating of the thick coats cause such problems that the coat surfaces are dried first to form skins, and then water remaining in the inner part is evaporated and raises the previously formed skins to cause blisters (heat blisters) or to cause cracks due to breakage of the skins. When the thick coats are dried at ordinary temperature for avoiding the occurrence of such blisters and cracks, there arise such problems that formation of a coat is insufficient, and cracks are formed on the coat because stress at the time of drying is not relaxed with heat.

Further, as aqueous vibration-damping coatings displaying excellent vibration-damping performance in a wide temperature range of from low temperatures to high temperatures, there have been proposed an aqueous vibration-damping coating comprising an emulsion state styrene-acrylic ester copolymer, a polyamidoepoxy compound and/or a melamine-formaldehyde compound, and a scaly inorganic powder dispersed in water (Japanese Patent Publication No. 24550/1988), and an aqueous vibration-damping coating comprising an emulsion state styrene-acrylic ester copolymer, an emulsion state vinyl acetate polymer, a crosslinking agent and a scaly inorganic powder dispersed in water (Japanese Patent Publication No. 33747/1990), etc., but coats formed from these coatings are insufficient in flexibility, and unsatisfying in the point of resistance to chipping and low temperature physical properties such as low temperature resistance to impact.

The main object of this invention is to provide an aqueous resin dispersion which is capable of forming film exhibiting excellent vibration-damping performance in a wide temperature range of from low temperatures to high temperatures, and moreover being flexible and excellent also in resistance to chipping and low temperature resistance to impact, and is excellent in adhesion to base materials and stabilities such as can-stability and mechanical stability.

Other objects and characteristics of this invention will be apparent from the following description.

According to this invention is provided an aqueous resin dispersion comprising polymer fine particles dispersed in an aqueous medium, wherein the polymer fine particles comprising (A) core-shell composite fine particles which comprise a core part comprising a carboxyl group-containing acrylic polymer (A-1) whose glass transition temperature ($Tg_{A-1}$) is in the range of −10° C. to 50° C. and a shell part covering the core part and comprising a polymer (A-2) whose glass transition temperature ($Tg_{A-2}$) is lower than −10° C., and wherein the core part occupies 50 to 90 weight % of the composite fine particles and the residual part is the shell part, and (B) core-shell composite fine particles which comprises core part comprising a carboxyl group-containing acrylic polymer (B-1) whose glass transition temperature ($Tg_{B-1}$) is in the range of −10° C. to 50° C. and lower by at least 10° C. than the glass transition temperature ($Tg_{A-1}$) of the polymer (A-1) of the core part of the composite fine particles (A), and a shell part covering the core part and comprising a polymer (B-2) whose glass transition temperature ($Tg_{B-2}$) is lower than −10° C., and wherein the core part occupies 50 to 90 weight % of the composite fine particles and the residual part is the shell part, and/or (C) polymer fine particles whose glass transition temperature ($Tg_C$) is in the range of −30° C. to 50° C. and different by at least 10° C. from the glass transition temperature ($Tg_{A-1}$) of the polymer (A-1) of the core part of the composite fine particles (A), and, based on the total amount of the fine particles (A), (B) and (C), the composite fine particles (A) are contained in an amount of 30 to 90 weight %, and the composite fine particles (B) and the polymer fine particles (C) are contained in total in an amount of 70 to 10 weight %.

The aqueous resin dispersion of this invention essentially comprises an aqueous medium and polymer fine particles dispersed stably therein, and has its large characteristic in the point that the polymer fine particles comprise a combination of certain specific core-shell type composite fine particles (A), and other specific core-shell type composite fine particles (B) and/or polymer fine particles (C) having a specific glass transition temperature. Coats formed from the aqueous resin dispersion have remarkable characteristics that they display such excellent vibration-damping performance that loss factor (tan δ) is 0.03 or more over a wide temperature range of, e.g., about 0° to about 60° C., and, moreover, the coats are also excellent in resistance to chipping at ordinary temperature and resistance to impact in a low temperature atmosphere.

The aqueous resin dispersion of this invention is further detailedly described below.

Core-shell type composite fine particles (A)

The composite fine particles (A) which the aqueous resin dispersion of the invention contains as an essential polymer fine particles component are core-shell composite fine particles which comprise (1) a core part comprising a carboxyl group-containing acrylic polymer (A-1) whose glass transition temperature ($Tg_{A-1}$) is in the range of $-10°$ C. to $50°$ C., and (2) a shell part covering the core part and comprising a polymer (A-2) whose glass transition temperature ($Tg_{A-2}$) is lower than $-10°$ C., and wherein the core part occupies 50 to 90 weight % of the composite fine particles and the residual part is the shell part.

Carboxyl group-containing acrylic polymer (A-1)

The acrylic polymer (A-1) constituting the core part of the composite fine particles (A) is one containing carboxyl groups, and its content is not strictly limited and can be varied over a wide range in accordance with easiness of emulsion polymerization, characteristics desired for the final aqueous resin dispersion, etc. In general, it is convenient that the content is in the range of 2.5 to 100 mg equivalent, preferably 5 to 90 mg equivalent and more preferably 10 to 80 mg equivalent per 100 g of the acrylic polymer (A-1). Further, it is desirable that the carboxyl group content of the acrylic polymer (A-1) is 50 weight % or more, preferably 70 weight % or more and more preferably 80 weight % or more of the total carboxyl group content of the composite fine particles (A).

Further, it is important that the glass transition temperature ($Tg_{A-1}$) of the acrylic polymer (A-1) is in the range of $-10°$ C. to $50°$ C. When the $Tg_{A-1}$ value of the acrylic polymer (A-1) consisting the core part of the composite fine particles (A) is lower than $-10°$ C., the vibration-damping performance at ordinary temperature of the resulting coat becomes insufficient and ordinary temperature resistance to chipping, adhesion to the surface of the base material, resistance to water, etc. tend to be insufficient, and when the $Tg_{A-1}$ value is higher than $50°$ C., vibration-damping performance at ordinary temperature tends to be insufficient, and ordinary-temperature resistances to chipping and low-temperature resistance to impact tend to lower. Thus, it is preferred that $Tg_{A-1}$ is in the range of particularly $-5°$ C. to $45°$ C. and more particularly $0°$ C. to $40°$ C.

Further, although the molecular weight of the acrylic polymer (A-1) is not particularly limited, it can have a weight average molecular weight of usually 500,000 or more, preferably 1,000,000 or more.

As far as the acrylic polymer (A-1) is one having the above characteristics, the kind of monomers constituting the polymer is not strictly limited. However, it is desirable that it is an acrylic copolymer formed usually by copolymerizing the following three monomers (M-1), (M-2) and (M-3) so as to satisfy the above carboxyl group content and $Tg_{A-1}$:

(M-1) A (meth)acrylic acid alkyl ester which is represented by the formula

wherein $R^1$ represents a hydrogen atom or methyl group, and $R^2$ represents a straight-chain or branched chain alkyl group having 1 to 12 carbon atoms, preferably 1 to 9: For example, methyl (meth)acrylate, ethyl (meth)acrylate, butyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, dodecyl (meth)acrylate, t-dodecyl (meth)acrylate, etc. Particularly preferred among them are methyl methacrylate, ethyl acrylate, butyl acrylate, octyl acrylate, 2-ethylhexyl acrylate, isononyl acrylate, etc.

(M-2) An α,β-unsaturated mono- or dicarboxylic acid having 3 to 5 carbon atoms: For example, acrylic acid, methacrylic acid, crotonic acid, citraconic acid, iraconic acid, maleic acid, maleic anhydride, fumaric acid, etc. Particularly preferred among them are acrylic acid, methacrylic acid and itaconic acid.

(M-3) A monomer copolymerizable with the (meth)acrylic acid alkyl ester of the above (M-1), represented by the formula

wherein $R^3$ represents a hydrogen atom or methyl group, and X represents a hydrogen atom, methyl group, ethyl group, vinyl group, mono- or di-halovinyl group, aryl group having 6 to 8 carbon atoms (for example, phenyl, tolyl, ethylphenyl, xylyl, etc.), nitrilegroup or —$OCOR^4$ group wherein $R^4$ represents a hydrogen atom or straight-chain or branched chain alkyl group having 1 to 12 carbon atoms: For example, vinyl aromatic compounds such as styrene, α-methyl styrene, vinyltoluene and ethylvinylbenzene; acrylonitrile, methacrylonitrile; vinyl esters such as vinyl formate, vinyl acetate, vinyl propionate and vinyl Versatate (trade name); monoolefins such as ethylene, propylene, butylene and isobutylene; conjugated diolefins such as butadiene, isoprene and chloroprene; etc. Preferred among them are those of the above formula (II) wherein X represents a phenyl group or nitrile group, and particularly styrene and acrylonitrile.

It is desired that the copolymerization rate of the above monomers is in the following range based on the total amount of the monomers, as change amounts at the time of polymerization of the acrylic polymer (A-1).

Monomer (M-1): generally 40 to 99.5 weight %, preferably 45 to 99 weight % and more preferably 50 to 98 weight %;

Monomer (M-2): generally 0.5 to 20 weight %, preferably 0.8 to 15 weight % and more preferably 1 to 10 weight %;

Monomer (M-3): generally 0 to 59.5 weight %, preferably 0 to 54 weight % and more preferably 0 to 48 weight %.

Polymer (A-2)

As the polymer (A-2) constituting the shell part of the composite fine particles of this invention is used one whose glass transition temperature ($Tg_{A-2}$) is lower than $-10°$ C. When $Tg_{A-2}$ is $-10°$ C. or more, the cold resistance and flexibility of the resulting coat tends to be lost, and particularly, low-temperature resistance to impact tends to lower. Thus desirably, the glass transition temperature ($Tg_{A-2}$) of the polymer (A-2) constituting the shell part is in the range of generally $-60°$ C. to $-15°$ C., particularly $-50°$ C. to $-20°$ C.

Further, the polymer (A-2) can have a weight average molecular weight of generally 500,000 or more and preferably 1,000,000 or more.

The kind of the polymer (A-2) is not particularly limited, and various thermoplastic resins can be used as the polymer (A-2), but acrylic polymers and urethane polymers are generally preferred, and the acrylic polymers are particularly preferred. These are further specifically described below.

As for the acrylic polymer (A-2-1) usable as the polymer (A-2) of the shell part, as far as its $Tg_{A-2}$ is in the above range of $Tg_{A-2}$, the composition of the monomers constituting the polymer is not particularly limited, but, for example, an acrylic (co)polymer is suitable obtained by (co)polymerizing at least one of the above monomers (M-1) as an essential component, if necessary in combination with one or plural members selected from the above monomers (M-2) and (M-3).

Thus suitably mentioned as monomer components constituting the acrylic polymer (A-2-1) are combinations of a $C_{1-9}$ alkyl ester of (meth)acrylic acid represented by methyl methacrylate, butyl acrylate or 2-ethylhexyl acrylate as monomer (M-1); acrylic acid or methacrylic acid as monomer (M-2); and styrene or vinyl Versatate (trade name) as monomer (M-3).

When the acrylic polymer (A-2-1) contains monomer (M-2) as a constitutive monomer, it is desirable that the content of monomer (M-2) in the polymer (A-2-1) is 50 weight % or less, preferably 30 weight % or less and more preferably 20 weight % or less based on the total-amount of monomer (M-2) in the polymer (A-1) and (A-2-1).

It is desirably that the constitutive rate of monomers constituting the acrylic polymer (A-2-1) is, as a charge amount at the time of polymerization of the acrylic polymer (A-2-1), in the following range based on the total amount of the monomers.

Monomer (M-1): generally 50 to 100 weight % and preferably 70 to 100 weight %;

Monomer (M-2): generally 0 to 10 weight % and preferably 0 to 5 weight %;

Monomer (M-3): generally 0 to 50 weight % and preferably 0 to 30 weight %.

On the other hand, the urethane polymer (A-2-2) usable as the polymer (A-2) can be ones usually used in the coating field, the adhesive field, etc.

Such a urethane polymer (A-2-2) can be prepared, according to usual methods, by reacting a chain extender with a urethane prepolymer having isocyanate group(s) at the termini obtained from a polyisocyanate compound and a polyol compound.

Examples of polyisocyanate compounds usable in preparation of urethane polymers (A-2-2) are aromatic polyisocyanate compounds such as 1,3- or 1,4-phenylene diisocyanate, 2,4- or 2,6-tolylene diisocyanate, 1,5-naphtylene diisocyanate, 4,4'-diphenylmethane diisocyanate, 3,3'-dimethyldiphenylmethane-4,4'-diisocyanate and 1,3-xylylene diisocyanate; aliphatic polyisocyanate compounds such as 1,4-tetramethylene diisocyanate, 1,6-hexamethylene diisocyanate, 2,2,4-trimethyl-1,6-hexamethylene diisocyanate, 1,8-octamethylene diisocyanate and 1,10-decamethylene diisocyanate; alicyclic polyisocyanate compounds such as 1,3- or 1,4-cyclohexylene diisocyanate, 1-methylcyclohexane-1,3- or 1,4-diisocyanate, 4,4'-dicyclohexylmethane diisocyanate, isophorone diisocyanate and 1,3-isocyanatomethylcyclohexane; etc. Preferred among these polyisocyanate compounds are, for example, 2,4- or 2,6-tolylene diisocyanate, 1,4-tetramethylene diisocyanate, 1,6-hexamethylene diisocyanate, and isophorone diisocyanate.

Polyol compounds to be reacted with the above polyisocyanate compounds include polyester polyols, polyester polyols and polyester ether polyols. Examples of polyester polyols are condensates of polyhydric alcohols such as, for example, ethylene glycol, propylene glycol, 1,4-butanediol, 1,6-hexanediol, glycerol, trimethylolpropane, pentaerythritol, sorbitan and sorbitol with polyvalent carboxylic acids such as, for example, succinic acid, adipic acid, sebacic acid, maleic acid, fumaric acid, mesaconic acid, citraconic acid, itaconic acid, glutaric acid, phthalic acid, isophthalic acid, terephthalic acid, pyromellitic acid, trimellitic acid and dodecanedicarboxylic acid; lactone polymerization products; etc. Examples of polyether polyols are polyalkylene glycols such as polyethylene glycol, polypropylene glycol, polytetramethylene glycol and polyethylene polypropylene glycol. Further, examples of polyester ether polyols are adducts of the above polyester polyols to alkylene oxides such as ethylene oxide; those having hydroxyl groups at the termini obtained by condensation of the above polyether polyols with the above polycarboxylic acids; etc.

As the chain extenders, there can be used compounds having at least two functional groups containing an active hydrogen atom reactive with an isocyanate group, and representative examples thereof are water, polyhydric alcohols, primary and secondary polyvalent amines, hydrazine and its derivatives, etc.

Examples of the polyhydric alcohols are aliphatic diols such as ethylene glycol, diethylene glycol, triethylene glycol, tetraethylene glycol, 1,2- or 1,3-propylene glycol, 1,2-1,3-, or 1,4-butylene glycol, 2,2-dimethyl-1,3-propylene glycol, 1,6-hexanediol and 2,2,4-trimethyl-1,3-pentanediol; alicyclic diols such as 2,2,4,4-tetramethylcyclobutanediol, 1,3-cyclopentanediol and methylenebis(4-cyclohexanol); aromatic diols such as 1,4-phenylene bis(2-hydroxyethyl ether) and 1,2-propylene glycol bis(2-hydroxyphenyl ether); etc. Examples of polyvalant amines are ethylenediamine, hexamethylenediamine, isophoronediamine, diaminodiphenylmethane, diethylenetriamine, etc; and examples of derivatives of hydrazine are substituted hydrazines such as dimethylhydrazine and 1,6-hexamethylenebishydrazine; reaction products of dicarboxylic acids, disulfonic acids, lactones or polyhydric alcohols with hydrazine; etc.

As the chain extender, there can particularly be mentioned, besides them, those used in emulsification of urethane prepolymers or urethane polymers for bestowing ionic properties on them, and specific examples thereof are dihydroxycarboxylic acids such as 2,2-dimethylolacetic acid, 2,2-dimethylolpropionic acid, 2,2-dimethylolbutyric acid and 2,2-dimethylovaleric acid; diaminocarboxylic acids such as 2,5-diaminobenzoic acid, α,ε-diaminocaproic acid (lysine) and 2-amino-5-guanidinovaleric acid (arginine); alkyldialkanolamines such as methyldiethanolamine; etc.

The above urethane prepolymer having isocyanate group(s) at the termini can, for example, be prepared by using the above polyisocyanate compound and the above polyol compound in such a rate that isocyanate groups are equivalently excess compared to hydroxyl groups and reacting them in an organic solvent, if necessary in the presence of a catalyst, at a temperature of about 25° to 110° C. with stirring under a nitrogen atmosphere.

Examples of usable organic solvents are ketones such as acetone and methyl ethyl ketone; ethers such as dioxane and tetrahydrofuran; esters such as ethyl acetate; aliphatic hydrocarbons such as heptane and octane; alicyclic hydrocarbons such as cyclohexane and methylcyclohexane; etc. Further, examples of useful reaction catalysts are tertiary amines such as triethylamine; inorganic salts such as stannous chloride; organic metal compounds such as di-n-butyltin dilaurate; etc.

A urethane polymer (A-2-2) fit as the shell part polymer (A-2) can be obtained by reacting a urethane prepolymer prepared in the above manner with a chain extender by a method known per se.

Structure of composite fine particles (A)

Composite fine particles (A) are composite fine particles having core-shell structure composed of the core part comprising the above-mentioned acrylic polymer (A-1) and the shell part comprising the above-mentioned polymer (A-2). The core part can substantially comprise the carboxyl group-containing acrylic polymer (A-1) alone, but, according to circumstances, a small amount of the polymer (A-2) can be included. The shell part can substantially comprise the polymer (A-2) alone, but, according to circumstances, a small amount of the carboxyl group-containing acrylic polymer (A-1) can be included.

The ratio of the core part polymers (A-1) and the shell part polymer (A-2) in the composite fine particles (A) can be varied in accordance with characteristics desired for the final aqueous resin dispersion, and the like. Generally, the polymer (A-1) can be in the range of 50 to 90 weight %, preferably 60 to 85 weight % and more preferably 70 to 80 weight %, and the polymer (A-2) can be in the range of 50 to 10 weight %, preferably 40 to 15 weight % and more preferably 30 to 20 weight %, based on the weight of the composite fine particles (A), respectively. When the rate of the polymer (A-1) in the composite fine particles (A) are less than 50 weight %, the vibration-damping properties of coats formed are liable to be insufficient, and on the other hand the rate goes beyond 90 weight %, there arises a tendency that the effect of the polymer (A-2) is slow to occur, the resulting coat becomes too hard and low-temperature resistance to impact lowers.

Further, when the shell polymer (A-2) is the aforesaid acrylic polymer (A-2-1), it is desirable that the core part polymers (A-1) and the shell part polymer (A-2) are selected, respectively so that the composition of all the monomers constituting the composite fine particles (A) of the invention may be in the following range.

Monomer (M-1): generally 40 to 99.5 weight %, preferably 45 to 99 weight % and more preferably 50 to 95 weight %;

Monomer (M-2): generally 0.5 to 10 weight %, and preferably 1 to 5 weight %;

Monomer (M-3): generally 0 to 60 weight %, preferably 0 to 55 weight % and more preferably 0 to 50 weight %.

It is preferred that the composite fine particles (A) in the aqueous resin dispersion of the invention are substantially spherical particles composed of the core part comprising acrylic polymer (A-1) and the shell part comprising the polymer (A-2) covering the core part, and the average particle size of the particles can be in the range of generally 0.05 to 5 micron, preferably 0.05 to 0.9 micron, more preferably 0.1 to 0.5 micron. In this connection, the average particle size of the composite fine particles (A), and following composite fine particles (B) and polymer fine particles (C) is a value measured by the DLS method.

Further, it is desirable that the shell part is uniformly covering the surface layer part of the core part, but in some case, the shell part can cover the core part partially, for example in a network state or insular state.

The composite fine particles (A) of the invention exhibit an acidic property due to the carboxyl group-containing acrylic polymer (A-1) mainly constituting the core part, and the carboxyl group content of the particles can be in the range of usually 5 to 150 mg equivalents, particularly 10 to 75 mg equivalents per 100 g of the composite particles, as measured by the conductometric titration method, The carboxyl group content of the acrylic polymer (A-1) of the core part can be measured by taking a sample at the time when formation of an emulsion of the core part polymer (A-1) ceased in the step of preparation of the aqueous dispersion and then subjecting it to the conductometric titration method.

Further, when the shell part polymer (A-2) is the urethane polymer (A-2-2), the composite fine particles (A) can, usually, be prepared by adding an acrylic monomer forming the core part to an emulsion or an aqueous solution of a urethane polymer for forming the shell part, as later described, and conducting polymerization. In this occasion, the carboxyl group content of the acrylic polymer (A-1) of the core part can be determined by measuring the respective carboxyl group contents of the urethane polymer and composite fine particles formed according to the above-mentioned method, and applying the results to the following calculation equation.

$$X_A = \frac{X_P - W_U \cdot X_U}{W_A}$$

wherein:

$X_A$: carboxyl group content of the acrylic polymer of the core part (mg equivalent/100 g of the acrylic polymer of the core part)

$X_P$: carboxyl group content of the composite fine particles (mg equivalent/100 g of the composite fine particles)

$X_U$: carboxyl group content of the urethane polymer (mg equivalent/100 g of the urethane polymer)

$W_U$: weight ratio of the urethane polymer in the composite fine particles $W_A$: weight ratio of the acrylic polymer of the core part in the composite fine particle Aqueous medium The aqueous medium as a dispersion medium for dispersing the above-described composite fine particles (A), and the following composite fine particles (B) and/or polymer fine particles (C) is usually water, but in some case it is also possible to use a mixed solvent of water with a water miscible organic solvent.

Preparation of the aqueous dispersion of the composite fine particles (A)

The aqueous dispersion of the composite fine particles (A) in the case where the shell part polymer (A-2) is an acrylic polymer (A-2-1) as mentioned above, can be prepared by a multi-stage emulsion polymerization method known per se such as the so-called seed polymerization method. For example, the aqueous dispersion can be prepared by (1) a step which comprises emulsion polymerizing the aforesaid monomers (M-1), (M-2) and (M-3) in a rate necessary for forming a core part polymer (A-1), in an aqueous medium and in the presence of surfactant and/or a protective colloid to give an emulsion of the carboxyl group-containing acrylic polymer (A-1), and (2) a step which comprises continuing the emulsion polymerization with one-step or multi-step addition of monomers (M-1), (M-2) and (M-3) in a rate necessary for forming a shell part acrylic polymer (A-2-1) to the formed emulsion of the acrylic polymer (A-1).

Any of nonionic, anionic, cationic and amphoteric surfactants can be used as the surfactant in the above step (1), but usually nonionic and/or anionic surfactants are suitable. Examples of usable anionic surfactants are fatty acid salts such as sodium stearate, sodium oleate and sodium laurate; alkylarylsulfonic acid salts such as sodium dodecylbenzenesulfonate; alkyl or alkenyl sulfate ester salts such as sodium lauryl sulfate; alkyl sulfosuccinate ester salts such as sodium monooctyl sulfosuccinate, sodium dioctyl sulfosuccinate and sodium polyoxyethylenelauryl sulfosuccinate; polyoxyalkylene alkyl or alkenyl ether sulfate ester salts such as sodium polyoxyethylene lauryl ether sulfate; polyoxyalkylene alkylaryl ether sulfate ester salts such as sodium polyoxyethylene nonylphenol ether sulfate; etc.

Further, examples of usable nonionic surfactants are polyoxyalkylene alkyl or alkenyl ethers such as polyoxyethylene lauryl ether and polyoxyethylene stearyl ether; polyoxyalkylene alkyl aryl ethers such as polyoxyethylene octylphenol ether and polyoxyethylene nonylphenol ether; sorbitan fatty acid esters such as sorbitan monolaurate, sorbitan monostearate and sorbitan trioleate; polyoxyalkylene sorbitan fatty acid esters such as polyoxyethylene sorbitan monolaurate; polyoxyalkylene fatty acid esters such as polyoxyl ethylene monolaurate and polyoxyethylene monostearate; glycerol fatty acid esters such as oleic acid monoglyceride and stearic acid monoglyceride; polyoxyethylene polyoxyproylene block copolymer; etc.

Further, as usable cationic surfactants, there can be mentioned alkylamine salts such as, for example, laurylamine acetate; quaternary ammonium salts such as, for example, lauryl trimethylammonium chloride and alkylbenzyldimethylammonium chloride; polyoxyethylalkylamine; etc. As amphoteric surfactants, there can for example, be mentioned alkyl betaines such as laurylbetaine, etc.

There can further be used fluorine containing surfactants wherein part of the hydrogens of the alkyl group of these surfactants are replaced by fluorine atom(s), and so-called reactive surfactants which have a radically copolymerizable unsaturated bond in the molecular structure of these surfactants, etc.

Among these surfactants, in view of only a few coagulation occurrence at the time of emulsion polymerization, etc., it is preferred to use polyoxyalkylene alkyl or alkenyl ethers and polyoxyalkylene alkylaryl ethers as nonionic surfactants; and alkylarylsulfonic acid salts, alkyl or alkenyl sulfate salts, alkylsulfosuccinic ester salts and their derivatives, polyoxyalkylene alkyl or alkenyl ether sulfate ester salts and polyoxyalkylene alkylaryl ether sulfate ester salts as anionic surfactants; etc. These surfactants can be used alone or in appropriate combinations, respectively.

The use amount of the above surfactants can be varied in accordance with the kind of surfactants to be used, the kind of monomers to be used, etc., but in general can be in the range of about 0.5 to about 10 weight parts, preferably about 1 to about 6 weight parts and more preferably about 1 to about 4 weight parts per 100 weight parts of the total of monomers used for formation of the core part polymers (A-1) and the shell part polymer (A-2-1).

On the other hand, examples of protective colloids usable in the above step (1) are polyvinyl alcohols such as partially saponified polyvinyl alcohol, completely saponified polyvinyl alcohol and modified polyvinyl alcohols; cellulose derivatives such as hydroxyethylcellulose, hydroxypropylcellulose and carboxymethylcellulose salts; natural polysaccharides such as guar gum; etc.

These protective collids may be used alone or in combination with the above surfactants. Although depending on use conditions, its use amount can usually be in the range of about 0 to about 3 weight parts per 100 weight parts in total of the monomers used for forming the core part polymers (A-1) and the shell part polymer (A-2-1).

Examples of polymerization initiators usable for emulsion polymerization of the above step (1) are persulfate salts such as ammonium persulfate, potassium persulfate and sodium persulfate; organic peroxides such as t-butyl hydroperoxide, cumene hydroperoxide and p-menthane hydroperoxide; hydrogen peroxide; etc., and they can be used alone or in a combination of plural members thereof.

The use amount of the polymerization initiator is not strict and can appropriately be selected, but in general can, for example, be in the range of about 0.05 to about 1 weight part, preferably about 0.1 to about 0.7 weight part and more preferably about 0.1 to about 0.5 weight part per 100 weight parts in total of monomers used for forming the core part polymer (A-1).

Further, in emulsion polymerization of the above step (1), a reducing agent can, if desired, be used together. Examples of usable reducing agents are reducing organic compounds such as, for example, ascorbic acid, tartaric acid, citric acid and glucose; and reducing inorganic compounds such as sodium thiosulfate, sodium sulfite, sodium bisulfite and sodium metabisulfite.

The use amount of such a reducing agent can appropriately be selected, too, and usually can, for example, be in the range of about 0.05 to about 1 weight part per 100 weight parts in total of the monomers used for forming the core part polymer (A-1).

Still further, in emulsion polymerization of the above step (1), a chain transfer agent can also be used, if desired. Examples of such chain transfer agents are cyanoacetic acid; $C_{1-8}$ alkyl esters of cyanoacetic acid; bromoacetic acid; $C_{1-8}$ alkyl esters of bromoacetic acid; aromatic compounds such as anthracene, phenanthrene, fluorene, and 9-phenyl fluorene; aromatic nitro compounds such as p-nitroaniline, nitrobenzene, dinitrobenzene, p-nitrobenzoic acid, p-nitrophenol and p-nitrotoluene; borane derivatives such as tributylborane; halogenated hydrocarbons such as carbon tetrabromide, carbon tetrachloride, 1,1,2,2-tetrabromoethane, tribromoethylene, trichloroethylene, bromotrichloromethane, tribromomethane and 3-chloro-1-propene; aldehydes such as chloral and furaldehyde; alkylmercaptans having 1 to 18 carbon atoms; aromatic mercaptans such as thiophenol and toluenemercaptan; mercaptoacetic acid; $C_{1-10}$ alkyl esters of mercaptoacetic acid; hydroxyalkylmercaptans having 1 to 12 carbon atoms; terpenes such as pinene and terpinolene; etc.

When the chain transfer agent is used, it is preferred that its use amount is in the range of about 0.005 to about 3.0 weight parts per 100 weight parts in total of the monomers used for forming the core part polymer (A-1).

As a suitable process when the above step (1) is practiced is mentioned a process which comprises successively adding monomers for forming a core part polymer (A-1), a surfactant and/or a protective colloid, a polymerization initiator, and other components to be used at need to an aqueous medium which may appropriately contain a surfactant and/or a protective colloid.

The emulsion polymerization of the step (1) can be carried out at a temperature of generally about 30° to about 100° C. and preferably about 40° to about 90° C. Thereby, an emulsion of a carboxyl group-containing acrylic polymer (A-1) can be formed.

Then in the step (2), monomers for forming a shell part acrylic polymer (A-2-1) are added to the thus obtained core part polymer (A-1) to further continue emulsion polymerization. This second-step emulsion polymerization is carried out substantially without further adding a surfactant and/or a protective colloid.

For example, the second-step polymerization can be carried out by successively adding monomer components necessary for forming a shell part acrylic polymer (A-2-1), a polymerization initiator, and other components to be used at need, for example a reducing agent or a chain transfer agent into the emulsion of the core polymer (A-1) obtained by the step (1).

The polymerization initiator used in this second-stage polymerization can be selected from those above-mentioned about the step (1). Although its use amount is not particularly limited, usually, it can for example be in the range of about 0.05 to about 1 weight parts, preferably about 0.1 to about 0.7 weight parts and more preferably about 0.1 to 0.5 weight parts per 100 weight parts in total of the monomers for forming the shell part acrylic polymer (A-2-1). Further, the reducing agent and chain transfer agent, when used, can be used, in the same rate as in the core part polymer (A-1).

Further, the emulsion polymerization at the second step of the step (2) can generally be carried out at a temperature of about 30° to about 100° C. and preferably about 40° to about 90° C.

An aqueous dispersion of the composite fine particles (A) wherein the core part comprises a carboxyl group-containing acrylic polymer (A-1) and the shell part comprises an acrylic polymer (A-2-1) can be prepared by the thus described multi-stage emulsion polymerization.

On the other hand, composite fine particles in the case where the shell part polymer (A-2) is a urethane polymer (A-2-2) can, for example, be prepared according to a method which comprises adding monomers for forming the above core part carboxyl group-containing acrylic polymer, for example, the above monomers (M-1), (M-2) and (M-3) to a solution or emulsion of a urethane polymer, preferably a urethane polymer emulsion, and conducting polymerization.

The urethane polymer emulsion usable for this method can, for example, be prepared by reacting the above urethane prepolymer with a chain extender according to a method as described below:

As preparation processes for a cationic emulsion, there can, for example, be mentioned (1) a process which comprises either converting a urethane prepolymer having isocyanate group(s) at the termini to a polymer using a diol having a tertiary amino group as a chain extender and then cationizing the polymer with a quaternary amino group-giving agent or acid, a cationizing the prepolymer by reacting it with a diol having a quaternary amino group as a chain extender, (2) a process which comprises converting a urethane prepolymer having isocyanate group(s) at the termini to a polymer using a polyalkylene polyamine as a chain extender and then reacting epihalohydrin and an acid with the polymer to cationize the polymer, etc.

Further, as preparation processes for an anionic emulsion, there can, for example, be mentioned (3) a process which comprises converting a urethane prepolymer having isocyanate group(s) at the termini to a polymer using a dihydroxycarboxylic acid or diaminocarboxylic acid as a chain extender, and then anionizing the polymer by neutralizing it with an alkaline compound, (4) a process which comprises sulfonating a urethane prepolymer having isocyanate group(s) at the termini obtained from a hdyrophobic polyol and an aromatic polyisocyanate, and then anionizing the sulfonated product by neturalizing it with a tertiary amine, etc.

Further, as preparation processes for a nonionic emulsion, there can, for example, be mentioned (5) a process which comprises dispersing a urethane prepolymer having isocyanate group(s) at the termini, using an emulsifier, into an aqueous solution, if necessary, containing a diamine or the like to chain extend the prepolymer with the water or the diamine, (6) a process which comprises reacting a urethane prepolymer having isocyanate group(s) at the termini with an alkylene oxide condensate of a long chain alcohol (a kind of noninoic surfactants) and an amine having a hydrophilic group such as a hydroxyl group, (7) a process which comprises reacting a urethane prepolymer having isocyanate group(s) at the termini with the above chain extender to give a urethane polymer, and mechanically dispersing the urethane resin into water with an emulsifier, etc.

As urethane polymer emulsions, there can also be used, besides those described above, those obtained by introducing into a urethane prepolymer a radical-polymerizable group by reacting a hydroxyl group-containing vinyl monomer such as, for example, 2-hydroxyethyl (meth)acrylate to a polyisocyanate compound or a urethane prepolymer having isocyanate group(s) at the termini, and then emulsion copolymerizing the resultant urethane prepolymer with the aforesaid (meth)acrylic monomer; those obtained by blocking part of the isocyanate groups of a urethane prepolymer having isocyanate groups at the termini with one of various blocking agents, or by reacting the urethane prepolymer or a urethane polymer with a urethane prepolymer wherein part of this isocyanate groups was blocked, and then emulsifying the resultant urethane prepolymer or urethane polymer containing blocked isocyanate group(s) in the molecule in the same manner as above; etc.

Further, there can also be used urethane polymer emulsions commercially available under the trade names such as, for example, "HUX-350", "HUX-320", "HUX-232", "HUX-401", "HUX-550" (these are made by Asahi Denka Kogyo K.K.), "SUPERFLEX 410", "SUPERFLEX 460" (these are made by Dai-ichi Kogyo Seiyaku Co., Ltd.), "MELUSI-437", "MELUSI-545", "MELUSI-585", "MELUSI-589", "MELUSI-590", "MELUSI-490" (these are made by Toyo Polymer Co., Ltd.), etc.

It is preferred to use, among them, anionic or nonionic emulsions as urethane polymer emulsions in view of easiness of formation of composite fine particles, the good dispersion stability of the resultant composite fine particles, etc.

Further, it is desirable that the average particles size of polymer particles in urethane polymer emulsions prepared in the above way is in the range of generally 0.01 to 0.5 micron, preferably 0.02 to 0.3 micron.

Polymerization of monomers for forming a core part carboxyl group-containing acrylic polymer (A-1) in the presence of a urethane polymer emulsion as prepared in the above-described manner, can be conducted according to the step (1) of the method mentioned above as a preparation method for composite fine particles (A) in the case where the shell part polymer (A-2) is an acrylic polymer (A-2-1), provided that, usually, a surfactant and/or a protective colloid are/is not used.

For example, the polymerization can be conducted according to a method which comprises adding monomers (M-1), (M-2) and (M-3) in a ratio necessary for forming the core part acrylic polymer (A-1) to an emulsion of the urethane polymer (A-2-2) as the shell part polymer, and conducting emulsion polymerization.

Further, as an alternative method for preparing the composite fine particles (A) in the case where the shell part polymer (A-2) is a urethane polymer (A-2-2), there can be adopted, for example, a method which comprises forming a carboxyl group-containing acrylic polymer (A-1) for the core part, adding thereto an aforesaid urethane prepolymer having radical-polymerizable group(s) (e.g., one obtained by conducting addition of a radical-polymerizable monomer such as 2-hydroxyethyl(meth)acrylate to a polyisocyanate compound or urethane prepolymer) or a solution of a urethane polymer in an appropriate radical-polymerizable monomer such as acrylic monomer, and conducting polymerization.

By this, there can be obtained an aqueous dispersion containing core-shell type composite fine particles (A) wherein the core part comprises a carboxyl group-containing acrylic polymer (A-1) and the shell part comprises a urethane polymer (A-2-2), The solid component concentration of the resulting aqueous dispersion of the composite fine particles (A) is not particularly limited and can be varied over a wide range depending on use, easiness of handling, etc., but it is suitable that the solid component concentration is in the range of generally about 10 to about 70 weight %, preferably about 30 to about 65 weight % and more preferably about 40 to about 60 weight %.

Further, the aqueous dispersion can, usually, have a pH in the range of 2 to 10 and preferably 2 to 8, and further a viscosity (a B-type rotational viscometer, 25° C., 20 rpm) in the range of about 10 to about 10,000 cps and preferably about 50 to about 5,000 cps.

The adjustment of the pH of the aqueous dispersion can be by adding to the aqueous dispersion ammonia water, an water soluble amine, an aqueous alkali hydroxide solution or the like.

Core-shell type composite fine particles (B)

The composite fine particles (B) usable in combination with the above-mentioned composite fine particles (A) in the aqueous resin dispersion of the invention, are, fundamentally, core-shell composite fine particles which comprise (1) a core part comprising a carboxyl group-containing acrylic polymer (B-1) whose glass transition temperature ($Tg_{B-1}$) is in the range of −10° C. to 50° C.

(2) a shell part comprising a polymer (B-2) which covers the core part and whose glass transition temperature ($Tg_{B-2}$) is lower than −10° C., and wherein the core part occupies 50 to 90 weight % of the composite fine particles (B) and the residual part is the shell part, as is the case with the composite fine particles (A). However, the composite fine particles (B) are different from the composite fine particles (A) in the point that as the core part acrylic polymer (B-1) of the composite fine particles (B) is used one whose glass transition temperature ($Tg_{B-1}$) is lower by at least 10° C., preferably 15° C. or more, more preferably 20° C. or more than the glass transition temperature ($Tg_{A-1}$) of the acrylic polymer (A-1) of the composite fine particles (A). It is further preferred that the temperature difference between $Tg_{A-1}$ and $Tg_{B-1}$ ($Tg_{A-1}-Tg_{B-1}$) is in the range of 10° to 50° C., particularly 15° to 45° C., further particularly 20° to 40° C.

Thus, as the composite fine particles (B), those satisfying the above glass transition temperature condition can be selected among those mentioned above as the composite fine particles (A), and used.

Polymer fine particles (C)

The polymer fine particles (C) usable in combination with the above composite fine particles (A) in the aqueous resin dispersion of this invention can be used without particular limitation about their kind so along as their glass transition temperature ($Tg_C$) is in the range of −30° C. to 50° C., preferably −25° C. to 40° C., more preferably −20° to 30° C., and is different from the glass transition temperature ($Tg_{A-1}$) of the acrylic polymer (A-1) of the core part of the composite fine particles (A) used together the rewith by at least 10° C., preferably 15° C. or more, more preferably 20° C. or more (both being higher and being lower are possible). Among them, those wherein the temperature difference $|Tg_{A-1}-Tg_C|$ between $Tg_{A-1}$ and $Tg_C$ is in the range of 10° to 50° C., preferably 15° to 45° C., more preferably 20° to 40° C. are preferred. Various polymers such as, for example, acrylic polymers, synthetic rubber polymers, saturated fatty acid vinyl polymers, urethane polymers and epoxy polymers can be used. Further, as to methods for preparation thereof, various methods such as the emulsion polymerization method and the suspension polymerization method can be used, but the emulsion polymerization method is preferred in view of the easiness of polymerization reaction, the stability of the resultant aqueous resin dispersion of this invention, various physical properties of the coat formed, etc.

When fine particles of a polymer such as, for example, an acrylic polymer, a synthetic rubber polymer or a saturated fatty acid vinyl polymer are prepared, it is preferred to prepare them as a (co)polymer emulsion by emulsion polymerizing appropriate monomer(s) in an aqueous medium, in the presence of a surfactant and/or a protective colloid, and, when desired, in the presence of a chain transfer agent, as is the case with the step (1) described in the preparation method for an emulsion of the composite fine particles (A).

Further, as the urethane polymer fine particles, there can be used those prepared in the same manner as in the urethane polymer emulsion described above in preparation of the composite fine particles (A) wherein the shell part polymer (A-2) is a urethane polymer.

Further, the epoxy polymer fine particles are fine particles mainly composed of an epoxy polymer of bisphenol A type, bisphenol F type or the like, and can, for example, be prepared according to a method which comprises mixing such an epoxy polymer with such a surfactant as mentioned in the preparation method for an emulsion of the composite fine particles (A), if necessary under heating, to conduct forced emulsification; a method which comprises conducting addition of a polybasic acid, an amino acid, an oxy-acid or the like to an epoxy polymer to introduce carboxyl groups, neutralizing the introduced carboxyl groups with a volatile base such as ammonia or a lower amine, and dispersing the resultant neutralization matter into water; a method which comprises polymerizing an acrylic monomer containing an unsaturated carboxylic acid in an organic solvent in the presence of an epoxy polymer to graft the resultant acrylic polymer containing carboxyl groups to the principal chain of the epoxy polymer, neutralizing the introduced carboxyl groups with a volatile base, and dispersing the resultant neutralization matter into water; a method which comprises reacting a carboxyl group-containing polymer previously prepared by polymerization with the epoxy groups of an epoxy polymer in the presence of a tertiary amine or the like to introduce carboxyl groups, neutralizing the introduced carboxyl groups with a volatile base, and dispersing the resultant neutralization matter into water; etc.

The polymer fine particles (C) can, generally, have an average particle size in the range of 0.01 to 1 micron, preferably 0.01 to 0.5 micron, more preferably 0.02 to 0.3 micron.

Aqueous resin dispersion

The aqueous resin dispersion of this invention can be prepared by dispersing the aforesaid composite fine particles (A), and the composite fine particles (B) and/or the polymer fine particles (C) in an aqueous medium, for example by mixing an aqueous dispersion of the composite fine particles (A) prepared as mentioned above with aqueous dispersion(s) of the composite fine particles (B) and/or polymer fine particles (C) prepared as mentioned above.

The compounding ratios among these components can be as follows based on the total amount (total amount of the solid components) of the fine particles (A), (B) and (C).

|  | General range (wt %) | Preferred range (wt %) | Optimum range (wt %) |
| --- | --- | --- | --- |
| Composite fine particles (A) | 30–90 | 40–80 | 50–70 |
| Composite fine particles (B) | 0–70 | 0–60 | 0–50 |
| Polymer fine particles (C) | 0–70 | 0–60 | 0–50 |
| Total amount of fine particles (B) and fine particles (C) | 70–10 | 60–20 | 50–30 |

The aqueous resin dispersion provided by this invention is an aqueous resin dispersion of a mixture of plural kinds of polymer fine particles wherein plural kinds of composite fine particles composed of the core part mainly comprising the carboxyl group-containing acrylic polymer and the shell part mainly comprising the acrylic polymer covering the core part, or at least one of such plural kinds of composite fine particles and the fine polymer particles are stably dispersed in an aqueous medium. For example, the aqueous resin dispersion can advantageously be used as a vehicle component in various aqueous coating composition such as a mastic coating, a sound insulating coating, a vibration-proof coating or a caulking material, and particularly as a vibration-damping aqueous coating composition.

Thus, this invention also provides an aqueous coating composition comprising the aqueous resin dispersion of the invention and an inorganic filler.

The inorganic filler is compounded with the composition of the invention for the purpose of bulking, adjustment of hardness of the coat, prevention of occurrence of blister, etc. As usable inorganic fillers can be exemplified inorganic solid powders of any of needle, fibrons, scaly, spherical and other shapes substantially insoluble or sparingly soluble to water, for example, calcium carbonate, silica, alumina, kaolin, clay, talc, diatom earth, mica, aluminum hydroxide, glass powder, barium sulfate, magnesium carbonate, sepiolite, wollastonite, zeolite, etc.

Further, if desired, there can further be used additives for lightening or introduction of bubbles such as shirasu balloons, glass balloons and resin balloons, and additives for improvement of workability, adjustment of viscosity, etc. such as bentnite and cellulose derivatives.

The compounding amount of these inorganic fillers can be varied in a wide range depending on their kinds, physical properties desired for coating compositions, etc., but can be in the range of generally 100 to 390 weight parts, preferably 120 to 380 weight parts and more preferably 150 to 300 weight parts per 100 weight parts of the whole solid components of the above aqueous resin dispersion.

Further, the inorganic filler is desirably one having an average particle size in the range of generally about 1 to about 50 microns and particularly about 5 to about 30 microns.

The aqueous coating composition of this invention can, if necessary, contain a rust-inhibiting pigment, a colorant, a crosslinking agent, etc., as is the case with conventional coating compositions.

Examples of rust-inhibiting pigments are red lead; chromic acid metal salts such as zinc chromate, barium chromate and strontium chromate; phosphoric acid metal salts such as zinc phosphate, calcium phosphate, aluminum phosphate, titanium phosphate and silicon phosphate and ortho- or condensed-phosphate salts of these metals; molybdic acid metal salts such as zinc molybdate, calcium molybdate, calcium zinc molybdate, potassium zinc molybdate, potassium zinc phosphomolybdate and potassium calcium phosphomolybdate; boric acid metal salts such as calcium borate, zinc borate, barium borate, barium metaborate and calcium metaborate; etc. Preferred among these rust-inhibiting pigments are nontoxic or low toxic rust-inhibiting pigments such as phosphoric acid metal salts, molybdic acid metal salts and boric acid metal salts.

The compounding amount of the rust-inhibiting pigment can for example be in the range of 0 to 50 weight parts and preferably 5 to 30 weight parts per 100 weight parts of the whole solid components of the aqueous resin dispersion.

Further, as coloring pigments can be mentioned organic or inorganic coloring pigments such as, for example, titanium oxide, carbon black, red oxide, Hansa Yellow, Benzidine Yellow, Phthalocyanine Blue and Quinacridone Red. The compounding amount of these coloring pigments can for example be in the range of 0 to 10 weight parts and preferably 0.5 to 5 weight parts per 100 weight parts of the whole solid components of the aqueous resin dispersion.

It is preferred that the particle size of these rust-inhibiting pigments and coloring pigments is in the range of 1 to 50 microns in view of smoothness of cost formed from the resulting coating composition, etc.

As to the aqueous coating composition using the aqueous resin dispersion of this invention, it is suitable that the ratio (hereafter, sometimes abbreviated as PWC) of the total pigments (total amount of the above inorganic fillers, coloring pigments, rust-inhibiting pigments and additives for lightening or introduction of bubbles) contained in the coat formed therefrom is made to be preferably 50 to 80 weight %, more preferably 55 to 77 weight %, further more preferably 60 to 75 weight %. When the PWC value is equal to or more than the lower limit value, the strength and resistance to chipping of the resultant coat are excellent, and when the PWC value is equal to or less than the upper limit value, the low temperature resistance to impact and flexibility of the coat are excellent.

Further, crosslinking agents capable of appropriate compounding to the aqueous coating composition include (a) water soluble polyvalent metal salts, for example, zinc salts such as zinc acetate, zinc formate, zinc sulfate and zinc chloride; aluminum salts such as aluminum acetate, aluminum nitrate and aluminum sulfate; calcium salts such as calcium acetate, calcium formate, calcium chloride, calcium nitrate and calcium nitrite; barium salts such as barium acetate, barium chloride and barium nitrite; magnesium salts such as magnesium acetate, magnesium formate, magnesium chloride, magnesium sulfate, magnesium nitrate and magnesium nitrite; lead salts such as lead acetate and lead formate; nickel salts such as nickel acetate, nickel chloride, nickel nitrate and nickel sulfate; manganese salts such as manganese acetate, manganese chloride, manganese sulfate and manganese nitrate; copper salts such as copper chloride, copper nitrate and copper sulfate; etc.;

(b) aziridine components, for example, reaction products of a polyisocyanate crosslinking agent as follows with ethyleneimine such as reaction product of 4,4'-diphenylmethane diisocyanate with ethyleneimine, etc., (c) polyisocyanate crosslinking agents, for example, polyisocyanate compounds used for making aforesaid urethane polymers, such as acromatic polyisocyanate compounds, aliphatic polyisocyanate compounds or alicyclic polyisocyanate compounds; dimers or trimers of these polyisocyanate compounds; adducts of these polyisocyanate compounds with polyhydric alcohols used as aforesaid chain extenders such as, for example, ethylene glycol and trimethylolpropane; etc., (d) water soluble epoxy resins, for example, glycerol diglycidyl ether, etc., (e) water soluble melamine resins, for example, methylolmelamine; products obtained by etherifying at least part of the hydroxyl groups of the methylolmelamines with methyl alcohol ethyl alcohol, n-butyl alcohol or the like; etc., (f) water-dispersible blocked isocyanates, i.e., aqueous dispersions of adducts of the above polyisocyanate crosslinking agents with volatile low molecular weight active hydrogen-containing compounds, for example, trimethylolpropane tritolylene diisocyanate methyl ethyl ketoxime adduct; etc.

As the above volatile low molecular weight active hydrogen-containing compounds, there can be exemplified, for example, aliphatic, alicyclic or aromatic alcohols such as methyl alcohol, ethyl alcohol, n-butyl alcohol, cyclohexyl alcohol, benzyl alcohol, ethylene glycol monoethyl ether, ethylene glycol monobutyl ether and phenol; hydroxy-tertiaryamines such as dimethylaminoethanol and diethylaminoethanol; ketoximes such as acetoxime and methyl ethyl ketoxime; active methylene compounds such as acetylacetone, acetoacetic acid ester and malonic acid esters; lactams such as ε-caprolactam; etc.

The use amount of these crosslinking agents can for example be in the range of e.g. 0 to 10 weight parts per 100 weight parts of the solid components of the above aqueous dispersion, in view of restraint of change with time lapse of the viscosity of the coating composition to be obtained.

There can, further if necessary, be added and mixed into the aqueous coating composition of this invention a dispersing agent such as an inorganic dispersing agent (for example, sodium hexametaphosphate, sodium tripolyphosphate, etc.) or an organic dispersing agent [for example, NOPCOSPERSE 44C (trade name, polycarboxylic acid type; produced by San Nopco Co. Ltd.)]; a silicone or another type of antifoaming agent; a thickener and a viscosity improver such as polyvinyl alcohol, a cellulose derivative, a polycarboxylic acid resin or a surfactant; an organic solvent such as ethylene glycol, butyl cellosolve, butyl carbitol or butyl carbitol acetate; an age resister; an antiseptic . fungicide; an ultraviolet absorber; an antistatic agent; and the like.

Although not particularly limited thereto, the aqueous coating composition can, generally, contain solid components in the range of about 10 to about 85 weight %, preferably about 30 to about 80 weight % and particularly preferably about 50 to about 70 weight %, have a pH in the range of 7 to 11 and preferably 8 to 10, and have a viscosity (a B-type rotational viscometer, 25° C., 20 rpm) in the range of about 3,000 to about 100,000 cps and preferably about 5,000 to a bout 50,000 cps.

Base materials to which the aqueous coating composition of this invention is applicable are not particularly limited, and examples thereof are steel sheets; various plated steel sheets such as lead-tin alloy-plated steel sheets (ternesheet steel sheets), tin-plated steel sheets, aluminum-plated steel sheets and lead-plated steel sheets, chromium-plated steel sheets, nickel-plated steel sheets; coated steel sheets such as electrodeposition-coated steel sheets; etc.

The application of the aqueous coating composition of this invention can be carried out by a coating method known per se such as, for example, brush coating, spray coating or roller coating, but airless spray coating is generally suitable. The thickness of the coat at that time is varied depending on use of base materials, etc., but it is suitable that the thickness is, usually, 500 microns or more, particularly in the range of about 1,000 to about 5,000 microns. Further, drying of the coat can be carried out by natural drying, drying with heating or the like.

This invention is further specifically described below according to examples. Various physcial properties in the present specification were measured by the following methods.

Glass transition temperature (Tg)

About 10 mg of an aqueous dispersion of a polymer as a sample is weight and put in a cylindrical cell having an inner diameter of about 5 mm and a depth of about 5 mm and made of aluminum foil having a thickness of about 0.05 mm, and dried at 100° C. for 2 hours. The resulting dried sample is used as measurement sample. Tg is determined by measurement with a temperature increase rate of 10° C./min form −150° C. using a differential scanning calorimeter (Model SSC-5000 produced by Seiko Instruments Inc.).

Since when composite fine particles composed of a core part and a shell part, for example the acrylic polymer composite fine particles contained in the aqueous resin dispersion of this invention, two different Tg values can be measured according to the about Tg measurement method, $Tg_{A-1}$ or $Tg_{B-1}$ is assigned to the higher Tg value and $Tg_{A-2}$ or $Tg_{B-2}$ is assigned to the lower Tg value.

Viscosity

Measured by a B-type rotational viscometer under conditions of 25° C. and 20 rpm.

Carboxyl group content

About 10 g of an aqueous dispersion of a polymer is accurately weighed, diluted with about 300 g of deionized water and adjusted to pH 3 or less by treatment with an ion exchange resin, and the resulting dispersion is used as a sample. When the shell part is composite fine particles comprising a urethane polymer, it is preferred, for preventing occurrence of coagulation of the aqueous dispersion, to add a surfactant or the like containing no carboxyl group to the aqueous dispersion, before treatment with an ion exchange resin. The sample is titrated with a 0.5N aqueous sodium hydroxide solution using an autographically recording type automatic electric conductivity titration apparatus, and the carboxyl group content per 100 g of the polymer is determined on calculation.

Average particle size

An aqueous dispersion of a polymer is diluted 50,000 to 150,000-fold with distilled water, and after sufficient stirring and mixing, about 10 ml of the dilution is sampled into a 21 mmφ glass cell using a Pasteur pipette. The resulting glass cell is set in the prescribed position of a dynamic light scattering photometer DLS-700 (produced by Otsuka Denshi Co., Ltd.), and measurement is carried out under the following measurement conditions.

| Measurement condition | |
| --- | --- |
| Measurement temperature | 25 ± 1° C. |
| Clock rate | 10 μsec (or micro sec) |
| Corelation channel | 512 |
| Number of times of integrating measurement | 200 times |
| Light scattering angle | 90° |

The results of the above measurement are computer-treated to determine an average particle size.

Further, methods for preparation and test of test samples used in the following example and comparative examples are as follows.

(1) Preparation of specimens

Coated steel sheets (ED steel sheets) of 0.8×100×200 mm obtained by electrodepositing a cationic electrodeposition coating "U-600" produced by Nippon Paint Co., Ltd. on steel sheets for automobiles prescribed in JIS G-3141 are coated with aqueous coating composition samples respectively to a dry coat thickness of 500 microns by the airless spraying coating method.

(2) Adhesion test

Cutting lines of such a depth as reaching the base material are made on the coat surface of a specimen prepared in the item (1) at intervals of 2 mm in the longitudinal and horizontal directions using a cross-cut adhesion tester (produced by Suga Shikenki Co., Ltd.) to prepare 100 checkerboard squares in 4 cm². Cellophane tape 24 mm wide (produced by Nichiban Co., Ltd.) is stuck on the checkerboard square, 180° quick peeling is made by hand, and the number of the remaining squares of the coat is counted. Adhesion is expressed by the number of the squares remaining in the coat per 100.

(3) Resistance to chipping test

A specimen prepared in the item (1) is allowed to stand 3 hours under a constant temperature condition of about 25° C., cutting lines of such a depth as reaching the base material are made on the coat surface, in a number of 11 at intervals of 2 mm in the longitudinal direction and in a number of 6 at intervals of 4 mm in the horizontal direction, using same cross-cut adhesion tester as used in the item (2), and then measurement is carried out at the same temperature.

The specimen is fixed leaning it at an angle of 60° against the horizontal surface, and nuts (M-4) are successively dropped at the cut part in the perpendicular direction on the coated side from a height of 2 m using a 25 mmφ polyvinyl chloride pipe. Normal-temperature resistance to chipping is evaluated by the total weight of nuts dropped up to the time when the material of the ED steel sheet is exposed.

(4) Low temperature impact resistance test

A specimen prepared in the item (1) is left as it is under a constant temperature condition of −30° C. for 3 hours or more and a du Pont type impact resistance test is carried out according to JIS K-5400.

As for the conditions for this, an impact model and a pedestal each having a radium of 6.35±0.03 mm are attached to a tester, and the resultant specimen is put between them with the coated side being upward. A weight having a mass of 500±1 g is dropped on the impact model from a height of 50 cm, and the degree of the damage of the coated side is evaluated by visual observation according to the following evaluation criterion.

◎ ... Change was not observed at all

○ ... A slight number of very small cracks were generated

△ ... A large number of very small cracks were generated

X ... Large cracks were generated (5) Vibration-damaging property test

A specimen is prepared in the same manner as in the above item (1) except that a beam (metal sheet for preparation of measuring specimens, attached to the vibration-damping material evaluation system) is used in place of the ED steel sheet, and the dry coat thickness is made to be 2,000μ, and then, loss factors at the temperatures of 0° C., 20° C., 40° C. and 60° C. are measured according to ASTM E756-83 using a vibration-damping material evaluation system "DAMP TEST" (produced by Toyo Corporation). The measured values are treated by the 3 dB method, and the resultant data are those converted into a frequency of 140 Hz.

EXAMPLES

Preparation of an Aqueous Dispersion of Composite Fine Particles

Reference Example 1

94 weight parts of deionized water, 1 weight part of sodium dodecylbenzenesulfonate and 1 weight part of polyoxyethylene nonylphenol ether (HLB about 16) as surfactants were charged into a reaction vessel equipped with a stirrer, a reflux condenser, a thermometer and raw material supplying equipments, and the mixture was heated to 70° C. under nitrogen flow. Then, into this reaction vessel were continuously added over a period of 3 hours a monomer mixture of uniformly mixing 35.2 weight parts of methyl methacrylate (MMA), 27.2 weight parts of 2-ethylhexyl acrylate (EHA), 16 weight parts of styrene (St) and 1.6 weight parts of acrylic acid (AA) as core part-forming monomers (Mc), and 6 weight parts of 5 weight % aqueous solution of ammonium persulfate (APS) as a polymerization initiator aqueous solution, and thereafter the mixture was held at the same temperature for 1 hour to obtain an emulsion comprising the core part-forming acrylic polymer. Part of this emulsion was taken out and measured for the carboxyl group content of the core part polymer by the aforesaid electric conductivity titration method.

Then, to this acrylic polymer emulsion were continuously added over a period of 1 hour, a monomer mixture of uniformly mixing 15.6 weight parts of EHA and 4.4 weight parts of St as a shell-forming monomer (Ms), and 2 weight parts of 5 weight % aqueous solution of APS, while the mixture in the vessel was successively maintained at 70° C., and then the resultant mixture was held at the same temperature for 2 hours, and an appropriate amount of about 25 weight % ammonia water was added to obtain an aqueous dispersion comprising the composite fine particles of the acrylic polymer. The respective compositions of Mc and Ms in this polymerization, Tg of the core part polymer and Tg of the shell part polymer, and the weight ratio of the core part to the shell part are shown in the later-described Table 1, and the solid content, pH, viscosity and average particle size of the resultant aqueous dispersion, and the carboxyl group contents of the core part polymer and the composite fine particles are shown in the later-described Table 2.

Reference Examples 2 to 5

The same procedure as in Reference example 1 was carried out except that, in Reference example 1, the composition of the monomer mixture Mc was changed and, if necessary, the Tg value of the core part polymer was changed to obtain an aqueous dispersion comprising the composite fine particles of the acrylic polymer. The respective compositions of Mc and Ms in each polymerization, Tg of the core part polymer and Tg of the shell part polymer, and the weight ratio of the core part to the shell part are shown in the later-described Table 1, and the solid content, pH, viscosity and average particle size of the resultant aqueous dispersion, and the carboxyl group contents of the core part polymer and the composite fine particles are shown in the later-described Table 2.

Reference Example 6

The same procedure as in Reference example 3 was carried out except that, in Reference example 3, the composition of the monomer mixture Ms was changed and the Tg value of the shell part polymer was changed to obtain an aqueous dispersion comprising the composite fine particles of the acrylic polymer. The respective compositions of Mc and Ms in this polymerization, Tg of the core part polymer and Tg of the shell part polymer, and the weight ratio of the core part to the shell part are shown in the later-described Table 1, and the solid content, pH, viscosity and average particle size of the resultant aqueous dispersion, and the carboxyl group contents of the core part polymer and the composite fine particles are shown in the later-described Table 2.

Reference Example 7

The same procedure as in Reference example 1 was carried out except that, in Reference example 1, the compositions of the monomer mixtures Mc and Ms and their use amounts were changed and the amount ratio of the core part to the shell part was changed to obtain an aqueous dispersion comprising the composite fine particles of the acrylic polymer. The respective compositions of Mc and Ms in each polymerization, Tg of the core part polymer and Tg of the shell part polymer, and the weight ratio of the core part to the shell part are shown in the later-described Table 1, and the solid content, pH, viscosity and average particle size of the resultant aqueous dispersion, and the carboxyl group contents of the core part polymer and the composite fine particles are shown in the later-described Table 2.

Reference Example 8

100 weight parts of a urethane polymer emulsion "HUX-350" (produced by Asahi Denka Kogyo K.K., solid content 30 weight %; the details are shown in the later-described Table 4) and 22 weight parts of deionized water were charged into the same reaction vessel as used in Reference example 1, and the mixture was heated to 70° C. under nitrogen flow. Then, a monomer mixture of uniformly mixing 15.4 weight parts of MMA, 39.2 weight parts of EHA, 14 weight parts of St and 1.4 weight parts of AA as core part-forming monomers (Mc), and 8 weight parts of 5 weight % aqueous solution of APS as a polymerization initiator aqueous solution were continuously added over a period of 3 hours, the resultant mixture was then held at the same temperature for 1 hour, and an appropriate amount of about 25 weight % ammonia water was added to obtain an aqueous dispersion of composite fine particles wherein the core part comprises the acrylic copolymer and the shell part comprises the urethane polymer.

The composition of Mc in this polymerization, the kind of the urethane polymer emulsion used for the shell part, and Tg of the core part polymer and Tg of the shell part polymer, and the weight ratio of the core part to the shell part are shown in the later-described Table 1, and the solid content, pH, viscosity and average particle size of the resultant aqueous dispersion, and the carboxyl group contents of the core part polymer and the composite fine particles are shown in the later-described Table 2.

TABLE 1

| | Monomer composition | | | | | | | | |
|---|---|---|---|---|---|---|---|---|---|
| | Core part (Mc) | | | | | Shell part (Ms) | | | |
| | M-1 (weight part) | | M-2 (weight part) | M-3 (weight part) | Tg | M-1 (weight part) | M-3 (weight part) | Tg | Core part/ shell part |
| Experiment No. | MMA | EHA | AA | St | (°C.) | EHA | St | (°C.) | (weight ratio) |
| Ref. example 1 | 35.2 | 27.2 | 1.6 | 16 | 40 | 15.6 | 4.4 | −40 | 80/20 |
| Ref. example 2 | 50.2 | 28.2 | 1.6 | — | 40 | 15.6 | 4.4 | −40 | 80/20 |
| Ref. example 3 | 26.4 | 36 | 1.6 | 16 | 20 | 15.6 | 4.4 | −40 | 80/20 |
| Ref. example 4 | 17.6 | 44.8 | 1.6 | 16 | 0 | 15.6 | 4.4 | −40 | 80/20 |
| Ref. example 5 | 37.7 | 26.3 | — | 16 | 40 | 15.6 | 4.4 | −40 | 80/20 |
| Ref. example 6 | 26.4 | 36 | 1.6 | 16 | 20 | 10.6 | 9.4 | 0 | 80/20 |
| Ref. example 7 | 23.1 | 31.5 | 1.4 | 14 | 20 | 23.4 | 6.6 | −40 | 70/30 |
| Ref. example 8 | 15.4 | 39.2 | 1.4 | 14 | 0 | Urethane polymer | | −20 | 70/30 |

Note)
Ref. example: Reference example

TABLE 2

| | Characteristic values of aqueous dispersion of composite fine particle | | | | | |
|---|---|---|---|---|---|---|
| | Solid | | | Average | Carboxyl group content (meq/100 g) | |
| Experiment No. | content (weight %) | pH | Viscosity (cps) | particle size (μm) | Core part polymer | Composite fine particles |
| Reference example 1 | 50 | 7.1 | 120 | 0.25 | 28 | 23 |
| Reference example 2 | 50 | 7.0 | 230 | 0.23 | 26 | 22 |
| Reference example 3 | 50 | 7.1 | 150 | 0.26 | 28 | 24 |
| Reference example 4 | 50 | 7.0 | 200 | 0.25 | 27 | 22 |
| Reference example 5 | 50 | 8.0 | 50 | 0.30 | <5 | <5 |
| Reference example 6 | 50 | 7.1 | 120 | 0.24 | 27 | 21 |
| Reference example 7 | 50 | 7.0 | 300 | 0.25 | 26 | 21 |
| Reference example 8 | 50 | 7.0 | 500 | 0.30 | 25 | 25 |

Preparation of Aqueous Dispersion of Polymer Fine Particles

Reference Example 9

89.5 weight parts of deionized water, 1.25 weight parts of sodium dodecylbenzenesulfonate and 1.25 weight parts of polyoxyethylene nonylphenol ether (HLB about 16) as surfactants were charged into the same reaction vessel as used in Reference example 1, and the mixture was heated to 70° C. under nitrogen flow. Then, a monomer mixture of uniformly mixing 44 weight parts of MMA, 34 weight parts of EHA, 20 weight parts of St and 2 weight parts of AA as monomers for forming polymer fine particles, and 10 weight parts of 5 weight % aqueous solution of APS as a polymerization initiator aqueous solution were continuously added to the mixture in the reaction vessel over a period of 3 hours, the resultant mixture was then held at the same temperature for 1 hour, and an appropriate amount of about 25 weight % ammonia water was added to obtain an aqueous dispersion of the acrylic polymer fine particles.

The composition of the monomer mixture used in this polymerization, and Tg of the polymer fine particles the solid content, pH, viscosity and average particle size of the resultant aqueous dispersion of the polymer fine particles are shown in Table 3.

Reference Examples 10 and 11

The same procedure as in Reference example 9 was carried out except that, in Reference example 9, the use ratio between monomers MMA and EHA was changed to change Tg of the polymer to obtain an aqueous dispersion of the acrylic polymer fine particles. The compositions of the monomer mixtures used in these polymerizations and Tg of the polymer fine particles, the solid content, pH, viscosity and average particle size of the resultant aqueous dispersions of polymer fine particles are shown in Table 3.

Reference Example 12

41 weight parts of deionized water and 2 weight parts of "GOHSERAN L-3266" (produced by The Nippon Synthetic Chemical Industry Co., Ltd., modified polyvinyl alcohol) as a protective colloid were charged into the same reaction vessel as used in Reference example 1, and the mixture was heated to 80° C. under nitrogen flow. Then, to the mixture in the reaction vessel were continuously added over a period of 3 hours, a preemulsion prepared from 46.6 weight parts of deionized water, 2 weight parts of sodium dodecylbenzenesulfonate as a surfactant and 100 weight parts of vinyl acetate (VAc) as a monomer for forming polymer fine particles in a separate vessel, and 6 weight parts of 5 weight % aqueous solution of APS as a polymerization initiator aqueous solution, the resultant mixture was then held at the same temperature for 1 hour, and an appropriate amount of about 25 weight % ammonia water was added to obtain an aqueous dispersion of the vinyl acetate polymer fine particles.

The composition of monomer mixture used in this polymerization and Tg of the polymer fine particles, and the solid content, pH, viscosity and average particle size of the resultant aqueous dispersion of the polymer fine particles are shown in Table 3.

Further, the aqueous dispersions of the urethane polymers used in Reference example 8 as the shell part polymer and used in Examples 12 to 14 as polymer fine particles are shown in Table 4.

TABLE 3

| | | | | | | | Characteristic values of aqueous dispersion of polymer fine particles | | | | |
|---|---|---|---|---|---|---|---|---|---|---|---|
| | Monomer composition (weight part) | | | | | Tg | Solid content | | Viscosity | Carboxyl group content | Average particle size |
| Experiment No. | MMA | EHA | St | VAc | AA | (°C.) | (weight %) | pH | (cps) | (meq/100 g) | (μm) |
| Ref. example 9 | 44 | 34 | 20 | — | 2 | 40 | 50 | 7.2 | 80 | 28 | 0.24 |
| Ref. example 10 | 33 | 45 | 20 | — | 2 | 20 | 50 | 7.1 | 90 | 30 | 0.25 |
| Ref. example 11 | 22 | 56 | 20 | — | 2 | 0 | 50 | 7.0 | 130 | 29 | 0.25 |
| Ref. example 12 | — | — | — | 100 | — | 30 | 50 | 7.1 | 60 | <5 | 0.65 |

Note)
Ref. example: Reference example

TABLE 4

| | | | | Characteristic values of urethane polymer emulsion | | | |
|---|---|---|---|---|---|---|---|
| Trade name | Tg (°C.) | Solid content (weight %) | pH | Viscosity (cps) | carboxyl group content (meq/100 g) | Average particle size (μm) |
| HUX-350 | −20 | 30 | 8.0 | 30 | 24 | <0.1 |
| HUX-320 | 15 | 33 | 8.0 | 50 | 20 | <0.2 |
| HUX-232 | 20 | 30 | 8.0 | 20 | 25 | <0.1 |

Preparation of Aqueous Coating Composition

Example 1

100 weight parts (about 50 weight parts as the solid components) of the aqueous dispersion of the composite fine particles of the acrylic polymer, prepared in Reference example 1 as the composite fine particles (A), and 100 weight parts (50 weight parts as the solid components) of the aqueous dispersion of the composite fine particles of the acrylic polymer, prepared in Reference example 4 as the composite fine particles (B), were mixed to obtain 200 weight parts of an aqueous resin dispersion (100 weight parts as the solid components). In the resultant aqueous resin dispersion were uniformly dispersed 2.0 weight parts (0.88 weight part as the solid components) of "NOPCOSPERSE 44C" (produced by San Nopco Co., Ltd., a polycarboxylic acid dispersion) as a dispersant, 218 weight parts of calcium carbonate powder as an inorganic filler, 3 weight parts of carbon black as a coloring pigment and 12 weight parts of barium metaborate as a rust-inhibiting pigment, using "T. K. HOMO DISPER" (produced by Tokushu Kika Co., Ltd.). Then, 0.5 weight part of "ADEKANOL UH-472" (produced by Asahi Denka Kogyo K.K.) as a thickener was added, and the mixture was further stirred to prepare an aqueous coating composition wherein PWC was 70 weight % and the solid content was 76.6 weight %.

Various physical property tests were conducted using the resultant aqueous coating composition. The compounding composition and properties of the coating composition, and the measurement results of various physical properties of coat were shown in Table 5.

Example 2 and Comparative Examples 1 and 2

The same procedure as in Example 1 was carried out except that, in Example 1, in place of using 100 weight parts each of the aqueous dispersion of the composite fine particles of Reference example 1 as the composite fine particles (A) and the aqueous dispersion of the composite fine particles of Reference example 4 as the composite fine particles (B), the use ratio was changed, or the aqueous dispersion of the composite fine particles of Reference example 4 was not used, and thereby an aqueous coating composition was prepared, and various physical property tests were conducted thereon. The compounding composition and properties of the coating composition, and the measurement results of various physical properties of coat were shown in Table 5.

Example 3 and Comparative Examples 3 and 4

The same procedure as in Example 1 was carried out except that, in Example 1, in place of using 100 weight parts of the aqueous dispersion of the composite fine particles of Reference example 4 as the composite fine particles (B), the aqueous dispersion of the composite fine particles of Reference example 2, Reference example 6 or Reference example 8 was used, and thereby an aqueous coating composition was prepared, and various physical property tests were conducted thereon. The compounding composition and properties of the coating composition, and the measurement results of various physical properties of coat were shown in Table 5.

Examples 4 to 6 and Comparative Examples 5 and 6

The same procedure as in Example 1 was carried out except that, in Example 1, in place of using the aqueous dispersion of the composite fine particles of Reference example 1 as the composite fine particles (A), the aqueous dispersion of the composite fine particles prepared in Reference example 2, Reference example 3, Reference example 5, Reference example 6 or Reference example 7 was used, and thereby an aqueous coating composition was prepared, and various physical property tests were conducted thereon. The compounding composition and properties of the coating composition, and the measurement results of various physical properties of coat were shown in Table 5. In this connection, the aqueous coating composition of Comparative example 5 prepared using the aqueous dispersion of composite fine particles of Reference example 5 was such that the dispersibility of the inorganic fillers was poor at the time of preparing the composition, and the resultant aqueous coating composition was insufficient in stability and unsuited for airless spray coating.

TABLE 5

| | | | | | Inorganic filler | Coloring pigment | Rust-inhibiting pigment |
|---|---|---|---|---|---|---|---|
| | Composite fine particles (A) | | Composite fine particles (B) | | | | |
| Experiment No. | Kind | Use amount (solid content) (weight part) | Kind | Use amount (solid content) (weight part) | Calcium carbonate (weight part) | Carbon black (weight part) | Barium metaborate (weight part) |
| Example 1 | Ref. example 1 | 100 (50) | Ref. example 4 | 100 (50) | 218 | 3 | 12 |
| Com. example 1 | Ref. example 1 | 40 (20) | Ref. example 4 | 160 (80) | 218 | 3 | 12 |
| Example 2 | Ref. example 1 | 140 (70) | Ref. example 4 | 60 (30) | 218 | 3 | 12 |
| Com. example 2 | Ref. Example 1 | 200 (100) | — | — | 218 | 3 | 12 |
| Com. example 3 | Ref. example 1 | 100 (50) | Ref. example 2 | 100 (50) | 218 | 3 | 12 |
| Com. example 4 | Ref. example 1 | 100 (50) | Ref. example 6 | 100 (50) | 218 | 3 | 12 |
| Example 3 | Ref. example 1 | 100 (50) | Ref. example 8 | 100 (50) | 218 | 3 | 12 |
| Example 4 | Ref. example 2 | 100 (50) | Ref. example 4 | 100 (50) | 218 | 3 | 12 |
| Example 5 | Ref. example 3 | 100 (50) | Ref. example 4 | 100 (50) | 218 | 3 | 12 |
| Com. example 5 | Ref. example 5 | 100 (50) | Ref. example 4 | 100 (50) | 218 | 3 | 12 |
| Com. example 6 | Ref. example 6 | 100 (50) | Ref. example 4 | 100 (50) | 218 | 3 | 12 |
| Example 6 | Ref. example 7 | 100 (50) | Ref. example 4 | 100 (50) | 218 | 3 | 12 |

TABLE 5-continued

| | Characteristic values of aqueous coating composition | | | | Physical properties of coat from aqueous coating composition | | | | | | |
|---|---|---|---|---|---|---|---|---|---|---|---|
| Experiment No. | solid content (weight part) | pH | Viscosity (cps) | PWC (weight %) | Adhesion X/100 | Resistance to chipping (kg) | Low temperatue resistance to impact (weight part) | Vibration-damping property | | | |
| | | | | | | | | 0° C. | 20° C. | 40° C. | 60° C. |
| Example 1 | 76.6 | 9.1 | 25000 | 70 | 100 | 40 | ⊚ | 0.03 | 0.06 | 0.04 | 0.06 |
| Com. example 1 | 76.6 | 9.1 | 27000 | 70 | 100 | 45 | ⊚ | 0.04 | 0.07 | 0.03 | 0.02 |
| Example 2 | 76.6 | 9.1 | 24000 | 70 | 100 | 45 | ○ | 0.03 | 0.05 | 0.04 | 0.07 |
| Com. example 2 | 76.6 | 9.1 | 23000 | 70 | 80 | 30 | Δ | 0.01 | 0.03 | 0.05 | 0.09 |
| Com. example 3 | 76.6 | 9.0 | 26000 | 70 | 80 | 30 | Δ | 0.01 | 0.02 | 0.04 | 0.09 |
| Com. example 4 | 76.6 | 9.0 | 26000 | 70 | 30 | 10 | X | 0.02 | 0.04 | 0.06 | 0.06 |
| Example 3 | 76.6 | 9.0 | 29000 | 70 | 100 | 55 | ⊚ | 0.04 | 0.06 | 0.04 | 0.06 |
| Example 4 | 76.6 | 9.3 | 26000 | 70 | 100 | 40 | ⊚ | 0.03 | 0.06 | 0.04 | 0.06 |
| Example 5 | 76.6 | 9.1 | 27000 | 70 | 100 | 45 | ⊚ | 0.03 | 0.06 | 0.06 | 0.04 |
| Com. example 5 | 76.6 | 9.3 | 56000 | 70 | Could not be measured because airless spray coating was difficult | | | | | | |
| Com. example 6 | 76.6 | 9.1 | 25000 | 70 | 50 | 15 | X | 0.04 | 0.06 | 0.06 | 0.04 |
| Example 6 | 76.6 | 9.1 | 26000 | 70 | 100 | 50 | ⊚ | 0.04 | 0.06 | 0.05 | 0.04 |

Note)
Com. example: Comparative example
Ref. example: Reference example

Example 7

The same procedure as in Example 1 was carried out except that, in Example 1, in place of using 100 weight parts of the aqueous dispersion of the composite fine particles of Reference example 4 as the composite fine particles (B), the aqueous dispersion of the polymer fine particles prepared in Reference example 11 as the polymer fine particles (C) was used, and thereby an aqueous coating composition was prepared, and various physical property tests were conducted thereon. The compounding composition and properties of the coating composition, and the measurement results of various physical properties of coat were shown in Table 6.

Examples 8 and 9

The same procedure as in Example 7 was carried out except that, in Example 7, in place of using 100 weight parts of the aqueous dispersion of the composite fine particles of Reference example 1 as the composite fine particles (A), the aqueous dispersion of the composite fine particles prepared in Reference example 3 or 7 was used, and thereby an aqueous coating composition was prepared, and various physical property tests were conducted thereon. The compounding composition and properties of the coating composition, and the measurement results of various physical properties of coat were shown in Table 6.

Example 10 and Comparative Example 7

The same procedure as in Example 7 was carried out except that, in Example 7, in place of using 100 weight parts each of the aqueous dispersion of the composite fine particles of Reference example 1 as the composite fine particles (A) and the aqueous dispersion of the polymer fine particles of Reference example 11 as the polymer fine particles (C), 100 weight parts each of the aqueous dispersion of the composite fine particles prepared in Reference example 4 as the composite fine particles (A) and the aqueous dispersion of the polymer fine particles prepared in Reference example 9 as the polymer fine particles (C) were used, or their use ratio was changed, and thereby an aqueous coating composition was prepared, and various physical property tests were conducted thereon. The compounding composition and properties of the coating composition, and the measurement results of various physical properties of coat were shown in Table 6.

Example 11 and Comparative Example 8

The same procedure as in Example 10 was carried out except that, in Example 10, in place of using 100 weight parts of the aqueous dispersion of the polymer fine particles of Reference example 9 as the polymer fine particles (C), 100 weight parts of the aqueous dispersion of the polymer fine particles prepared in Reference example 10, or 100 weight parts of the aqueous dispersion of the polymer fine particles prepared in Reference example 11 was used, and thereby an aqueous coating composition was prepared, and various physical property tests were conducted thereon. The compounding composition and properties of the coating composition, and the measurement results of various physical properties of coat were shown in Table 6.

Example 12

The same procedure as in Example 10 was carried out except that, in Example 10, in place of using 100 weight parts each of the aqueous dispersion of the composite fine particles of Reference example 4 as the composite fine particles (A) and the aqueous dispersion of the polymer fine particles of Reference example 9 as the polymer fine particles (C), 140 weight parts (70 weight parts as the solid components) of the aqueous dispersion of the composite fine particles of Reference example 4, and 60 weight parts (30 weight parts as the solid components) of the aqueous dispersion of the vinyl acetate polymer fine particles prepared in Reference example 12 as the polymer fine particles (C) were used, and thereby an aqueous coating composition was prepared, and various physical property tests were conducted thereon. The compounding composition and properties of the coating composition, and the measurement results of various physical properties of coat were shown in Table 6.

Examples 13 to 15

The same procedure as in Example 12 was carried out except that, in Example 12, in place of using 60 weight parts (30 weight parts as the solid components) of the aqueous dispersion of the vinyl acetate polymer fine particles of Reference example 12 as the polymer fine particles (C), 100 weight parts (about 30 weight parts as the solid components) of an aqueous dispersion of the urethane polymer fine particles "HUX-232" or "HUX-350" (these are produced by Asahi Denka Kogyo K.K., a urethane polymer emulsion, solid content 30 weight %), or 91 weight parts (about 30 weight parts as the solid components) of "HUX-320" (produced by Asahi Denka Kogyo K.K., a urethane polymer emulsion, solid content 33 weight %) was used, and thereby an aqueous coating composition was prepared, and various physical property tests were conducted thereon. The compounding composition and properties of the coating composition, and the measurement results of various physical properties of coat were shown in Table 6.

Comparative Example 9

The same procedure as in Example 7 was carried out except that, in Example 7, in place of using 100 weight parts of the aqueous dispersion of the composite fine particles of Reference example 1 as the composite fine particles (A), aqueous dispersion of the polymer fine particles prepared in Reference example 9 was used without using the composite fine particles (A), and thereby an aqueous coating composition was prepared, and various physical property tests were conducted thereon. The compounding composition and properties of the coating composition, and the measurement results of various physical properties of coat were shown in Table 6.

TABLE 6

| Experiment No. | Composite fine particles (A) Kind | Composite fine particles (A) Use amount (solid content) (weight part) | Polymer fine particles (C) Kind | Polymer fine particles (C) Use amount (solid content) (weight part) | Inorganic filler Calcium carbonate (weight part) | Coloring pigment Carbon black (weight part) | Rust-inhibiting pigment Barium metaborate (weight part) |
|---|---|---|---|---|---|---|---|
| Example 7 | Ref. example 1 | 100 (50) | Ref. example 11 | 100 (50) | 218 | 3 | 12 |
| Example 8 | Ref. example 3 | 100 (50) | Ref. example 11 | 100 (50) | 218 | 3 | 12 |
| Example 9 | Ref. example 7 | 100 (50) | Ref. example 11 | 100 (50) | 218 | 3 | 12 |
| Example 11 | Ref. example 4 | 100 (50) | Ref. example 9 | 100 (50) | 218 | 3 | 12 |
| Com. example 7 | Ref. example 4 | 40 (20) | Ref. example 9 | 160 (80) | 218 | 3 | 12 |
| Example 11 | Ref. example 4 | 100 (50) | Ref. example 10 | 100 (50) | 218 | 3 | 12 |
| Com. example 8 | Ref. example 4 | 100 (50) | Ref. example 11 | 100 (50) | 218 | 3 | 12 |
| Example 12 | Ref. example 4 | 140 (70) | Ref. example 12 | 60 (30) | 218 | 3 | 12 |
| Example 13 | Ref. example 4 | 140 (70) | HUX-232 | 100 (30) | 218 | 3 | 12 |
| Example 14 | Ref. example 4 | 140 (70) | HUX-350 | 100 (30) | 218 | 3 | 12 |
| Example 15 | Ref. example 4 | 140 (70) | HUX-320 | 91 (30) | 218 | 3 | 12 |
| Com. example 9 | — | — | Ref. example 9 | 100 (50) | 218 | 3 | 12 |
|  |  |  | Ref. example 11 | 100 (50) |  |  |  |

| Experiment No. | Characteristic values of aqueous coating composition solid content (weight part) | pH | Viscosity (cps) | PWC (weight %) | Adhesion X/100 | Resistance to chipping (kg) | Low temperature resistance to impact (weight part) | Vibration-damping property 0° C. | Vibration-damping property 20° C. | Vibration-damping property 40° C. | Vibration-damping property 60° C. |
|---|---|---|---|---|---|---|---|---|---|---|---|
| Example 7 | 76.6 | 9.1 | 22000 | 70 | 100 | 40 | ○ | 0.04 | 0.06 | 0.04 | 0.06 |
| Example 8 | 76.6 | 9.0 | 24000 | 70 | 100 | 35 | ○ | 0.04 | 0.06 | 0.06 | 0.04 |
| Example 9 | 76.6 | 9.1 | 27000 | 70 | 100 | 45 | ⊙ | 0.03 | 0.09 | 0.08 | 0.05 |
| Example 10 | 76.6 | 9.2 | 24000 | 70 | 100 | 35 | ○ | 0.03 | 0.06 | 0.05 | 0.06 |
| Com. example 7 | 76.6 | 9.2 | 23000 | 70 | Could not be measured because peeling occurred at the time of cutting | | X | 0.01 | 0.03 | 0.05 | 0.07 |
| Example 11 | 76.6 | 9.1 | 25000 | 70 | 100 | 40 | ○ | 0.03 | 0.06 | 0.07 | 0.04 |
| Com. example 8 | 76.6 | 9.0 | 25000 | 70 | 100 | 40 | ○ | 0.03 | 0.07 | 0.03 | 0.02 |
| Example 12 | 76.6 | 9.2 | 26000 | 70 | 100 | 40 | ○ | 0.03 | 0.07 | 0.05 | 0.05 |
| Example 13 | 70.2 | 9.0 | 20000 | 70 | 100 | 70 | ○ | 0.07 | 0.06 | 0.09 | 0.06 |
| Example 14 | 70.2 | 9.1 | 22000 | 70 | 100 | 80 | ⊙ | 0.08 | 0.07 | 0.08 | 0.05 |
| Example 15 | 71.6 | 9.2 | 22000 | 70 | 100 | 75 | ⊙ | 0.07 | 0.09 | 0.08 | 0.05 |
| Com. example 9 | 76.6 | 9.2 | 23000 | 70 | Could not be measured because peeling occurred at the time of cutting | | X | 0.02 | 0.09 | 0.04 | 0.06 |

Note)
Com. example: Comparative example
Ref. example: Reference example

What is claimed is:

1. An aqueous resin dispersion comprising polymer fine particles dispersed in an aqueous medium, wherein the polymer fine particles comprising (A) core-shell composite fine particles which comprise a core part comprising a carboxyl group-containing acrylic polymer (A-1) whose glass transition temperature ($Tg_{A-1}$) is in the range of $-10°$ C. to $50°$ C. and a shell part covering the core part and comprising a polymer (A-2) whose glass transition temperature ($Tg_{A-2}$) is lower than $-10°$ C., and wherein the core part occupies 50 to 90 weight % of the composite fine particles and the residual part is the shell part, and (B) core-shell composite fine particles which comprise a core part comprising a carboxyl group-containing acrylic polymer (B-1) whose glass transition temperature ($Tg_{B-1}$) is in the range of $-10°$ C. to $50°$ C. and lower by at least $10°$ C. than the glass transition temperature ($Tg_{A-1}$) of the polymer (A-1) of the core part of the composite fine particles (A), and a shell part covering the core part and comprising a polymer (B-2) whose glass transition temperature ($Tg_{B-2}$) is lower than $-10°$ C., and wherein the core part occupies 50 to 90 weight % of the composite fine particles and the residual part is the shell part, and/or (C) polymer fine particles whose glass transition temperature ($Tg_C$) is in the range of $-30°$ C. to $50°$ C. and different by at least $10°$ C. from the glass transition temperature ($Tg_{A-1}$) of the polymer (A-1) of the core part of the composite fine particles (A), and, based on the total amount of the fine particles (A), (B) and (C), the composite fine particles (A) are contained in an amount of 30 to 90 weight %, and the composite fine particles (B) and the polymer fine particles (C) are contained in total in an amount of 70 to 10 weight %.

2. The aqueous resin dispersion according to claim 1 wherein each of the glass transition temperature ($Tg_{A-1}$) of the acrylic polymer (A-1) of the core part of the composite fine particles (A) and the glass transition temperature ($Tg_{B-1}$) of the acrylic polymer (B-1) of the core part of the composite fine particles (B) is in the range of $-5°$ C. to $45°$ C.

3. The aqueous resin dispersion according to claim 1 wherein each of the glass transition temperature ($Tg_{A-2}$) of the polymer (A-2) of the shell part of the composite fine particles (A) and the glass transition temperature ($Tg_{B-2}$) of the polymer (B-2) of the shell part of the composite fine particles (B) is in the range of $-15°$ C. to $-60°$ C.

4. The aqueous resin dispersion according to claim 1 wherein the glass transition temperature ($Tg_{B-1}$) of the acrylic polymer (B-1) of the core part of the composite fine particles (B) is lower by $15°$ C. or more than the glass transition temperature ($Tg_{A-1}$) of the acrylic polymer (A-1) of the core part of the composite fine particles (A).

5. The aqueous resin dispersion according to claim 1 wherein the difference ($Tg_{A-1} - Tg_{B-1}$) between the glass transition temperature ($Tg_{A-1}$) of the acrylic polymer (A-1) of the core part of the composite fine particles (A) and the glass transition temperature ($Tg_{B-1}$) of the acrylic polymer (B-1) of the core part of the composite fine particles (B) is in the range of $10°$ C. to $50°$ C.

6. The aqueous resin dispersion according to claim 1 wherein the glass transition temperature ($Tg_C$) of the polymer fine particles (C) is in the range of $-25°$ C. to $40°$ C.

7. The aqueous resin dispersion according to claim 1 wherein the glass transition temperature ($Tg_C$) of the polymer fine particles (C) is different by $15°$ C. or more from the glass transition temperature ($Tg_{A-1}$) of the acrylic polymer (A-1) of the core part of the composite fine particles (A).

8. The aqueous dispersion according to claim 1 wherein the difference between the glass transition temperature ($Tg_{A-1}$) of the acrylic polymer (A-1) of the core part of the composite fine particles (A) and the glass transition temperature ($Tg_C$) of the polymer fine particles (C) is in the range of $10°$ C. to $50°$ C.

9. The aqueous resin dispersion according to claim 1 wherein the carboxyl group-containing acrylic polymers (A-1) and (B-1) contain 2.5 to 100 milligram equivalents of the carboxyl group per 100 g of the polymers (A-1) and (B-1), respectively.

10. The aqueous resin dispersion according to claim 1 wherein in the composite fine particles (A) and (B), the core part occupies 60 to 85% by weight of the composite fine particles, respectively.

11. The aqueous resin dispersion according to claim 1 wherein each of the carboxyl group-containing acrylic polymers (A-1) and (B-1) is a carboxyl group-containing acrylic copolymer obtained by copolymerizing (M-1) 40 to 99.5 weight % of a (meth)acrylic acid alkyl ester represented by the formula

wherein $R^1$ represents a hydrogen atom or methyl group, and $R^2$ represents a straight-chain or branched chain alkyl group having 1 to 12 carbon atoms, (M-2) 0.5 to 20 weight % of an $\alpha,\beta$-unsaturated mono- or di-carboxylic acid having 3 to 5 carbon atoms, and (M-3) 0 to 59.5 weight % of a monomer represented by the formula

wherein $R^3$ represents a hydrogen in atom or methyl group, and X represents a hydrogen atom, methyl group, ethyl group, vinyl group, mono- or di-halovinyl group, aryl group having 6 to 8 carbon atoms, nitrile group or $-OCOR^4$ group, and therein $R^4$ represents a hydrogen atom or straight-chain or branched chain alkyl group having 1 to 12 carbon atoms, and copolymerizable with the (meth)acrylic acid alkyl ester of the above (M-1).

12. The aqueous resin dispersion according to claim 1 wherein each of the polymers (A-2) and (B-2) is an acrylic polymer or a urethane polymer.

13. The aqueous resin dispersion according to claim 12 wherein the acrylic polymer is an acrylic (co)polymer obtained by (co)polymerizing (M-1) 50 to 100 weight % of a (meth)acrylic acid alkyl ester represented by the formula

wherein $R^1$ represents a hydrogen atom or methyl group, and $R^2$ represents a straight-chain or branched chain alkyl group having 1 to 12 carbon atoms, (M-2) 0 to 10 weight % of an $\alpha,\beta$-unsaturated mono- or di-carboxylic acid having 3 to 5 carbon atoms, and (M-3) 0 to 50 weight % of a monomer represented by the formula

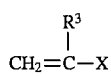

wherein $R^3$ represents a hydrogen atom or methyl group, and X represents a hydrogen atom, methyl group, ethyl group, vinyl group, mono- or di-halovinyl group, aryl group having 6 to 8 carbon atoms, nitrile group or —$OCOR^4$ group, and therein $R^4$ represents a hydrogen atom or straight-chain or branched chain alkyl group having 1 to 12 carbon atoms,
and copolymerizable with the (meth)acrylic acid alkyl ester of the above (M-1).

14. The aqueous resin dispersion according to claim 1 wherein each of the composite fine particles (A) and (B) has an average particle size in the range of 0.05 to 5 microns.

15. The aqueous resin dispersion according to claim 1 wherein the composite fine particles (A) and (B) contain 5 to 150 milligram equivalents of the carboxyl group per 100 g of the particles (A) and (B), respectively.

16. The aqueous resin dispersion according to claim 1 wherein the polymer fine particles (C) are fine particles of an acrylic polymer, a synthetic rubber polymer, a saturated fatty acid vinyl polymer, a urethane polymer or an epoxy polymer.

17. The aqueous resin dispersion according to claim 1 wherein the polymer fine particles (C) have an average particle size in the range of 0.01 to 1 micron.

18. The aqueous resin dispersion according to claim 1 which contains 40 to 80 weight % of the composite fine particles (A) and 60 to 20 weight % in total of the composite fine particles (B) and polymer fine particles (C), based on the total amount of the fine particles (A), (B) and (C).

19. An aqueous coating composition comprising the aqueous resin dispersion according to claim 1 and an inorganic filler.

20. The composition according to claim 19 wherein the inorganic filler is selected from the group consisting of calcium carbonate, silica, alumina, kaolin, clay, talc, diatom earth, mica, aluminum hydroxide, glass powder, barium sulfate, magnesium carbonate, sepiolite, wollastonite and zeolite.

21. The composition according to claim 19 which contains the inorganic filler in the range of 100 to 390 weight parts per 100 weight parts of the whole solid components of the aqueous resin dispersion.

22. The composition according to claim 19 wherein the inorganic filler has an average particle size in the range of 1 to 50 microns.

23. The composition according to claim 19 wherein the aqueous coating composition is a vibration-damping aqueous coating composition.

24. An article coated with the composition according to claim 23.

* * * * *